July 25, 1944.  H. L. JOHNSON  2,354,378
SCREEN CLEANER FOR CORN SIZING APPARATUS
Original Filed Feb. 4, 1942   2 Sheets-Sheet 1
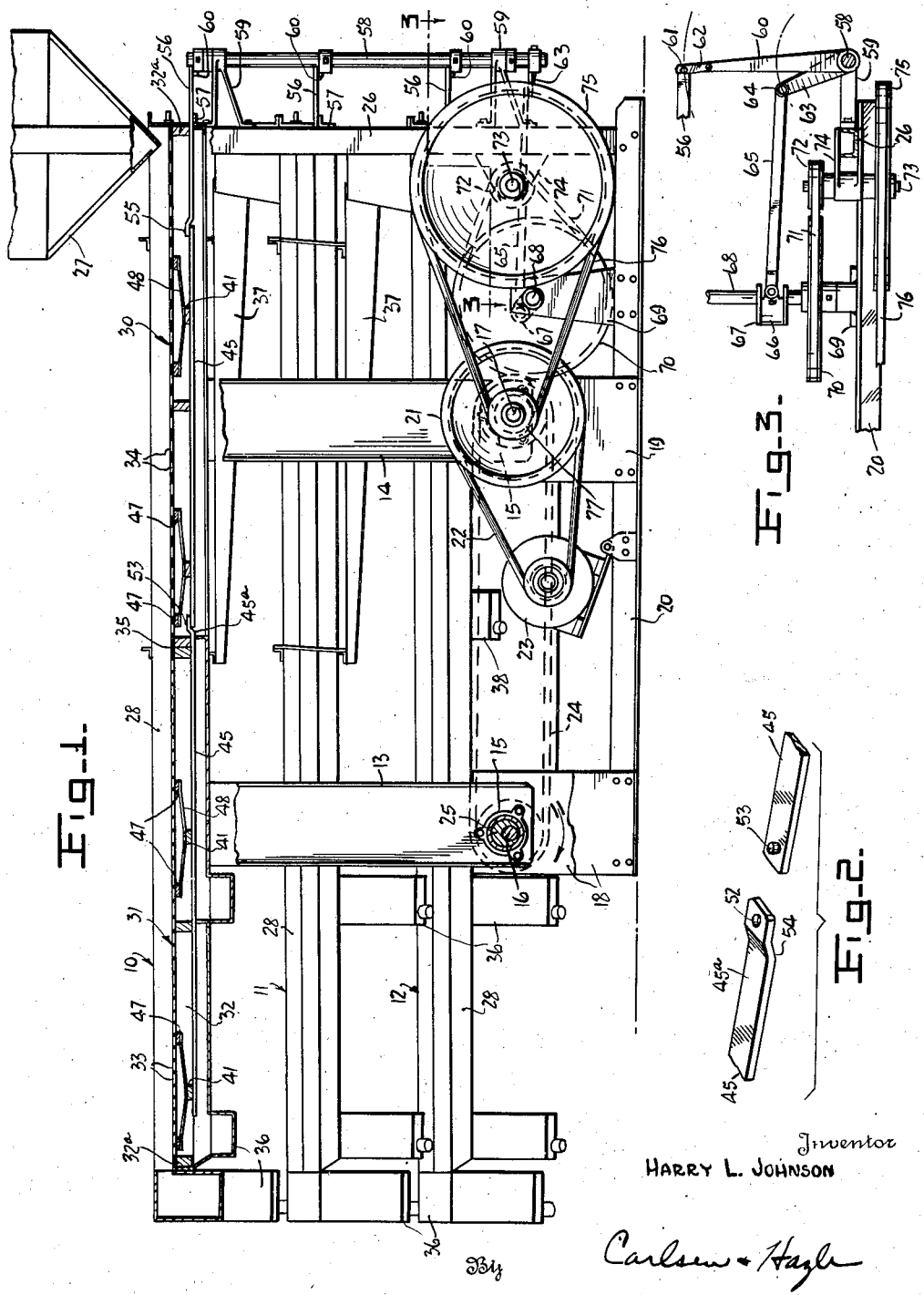
Inventor
HARRY L. JOHNSON
By Carlsen & Hagle
Attorneys July 25, 1944.  H. L. JOHNSON  2,354,378
SCREEN CLEANER FOR CORN SIZING APPARATUS
Original Filed Feb. 4, 1942  2 Sheets-Sheet 2

Inventor
HARRY L. JOHNSON
By Carlsen & Hazle
Attorneys

Patented July 25, 1944

2,354,378

UNITED STATES PATENT OFFICE 2,354,378

SCREEN CLEANER FOR CORN SIZING APPARATUS

Harry L. Johnson, Minneapolis, Minn.

Original application February 4, 1942, Serial No. 429,492. Divided and this application May 17, 1943, Serial No. 487,284

4 Claims. (Cl. 209—385)

This invention relates generally to improvements in apparatus for sizing or grading hybrid seed corn and more specifically to an improved mechanism for cleaning or clearing the screens of such apparatus.

In the operation of apparatus of this nature, for separating hybrid seed corn into a plurality of closely dimensioned sizes, it is found that the screens have a tendency to become clogged with corn kernels which lodge in the openings in the screens. This action, called "blinding" in the trade, greatly hinders the proper sizing operation of the screens and unless the screens are continuously cleaned or cleared of lodged kernels, the grading capacity of the apparatus will be considerably reduced.

It is the primary object of my invention, therefore, to provide mechanism for continuously wiping and clearing the screens and which will perform such operation in a practical and efficient manner. Another object is to provide mechanism of this character wherein the screen cleaning or wiping elements are caused both to wipe along undersides of the screen and to vibrate toward and away from the screens with a hammering or tapping action which is found not only to keep the screens completely cleared of lodged kernels but also to clear the kernels from the screen openings without in any way chipping or damaging the kernels. The latter factor is important, as will be apparent, in the separating of seed corn.

These and other more detailed and specific objects will be disclosed in the course of the following specification, reference being had to the accompanying drawings, in which—

Fig. 1 is a side view, partially in vertical and longitudinal section, of a corn grading or sizing apparatus embodying my present invention.

Fig. 2 is an enlarged perspective view of the adjacent connecting ends of the wiper actuating bars.

Fig. 3 is a fragmentary horizontal section through a lower corner portion of the apparatus, taken along the line 3—3 in Fig. 1.

Figure 4:
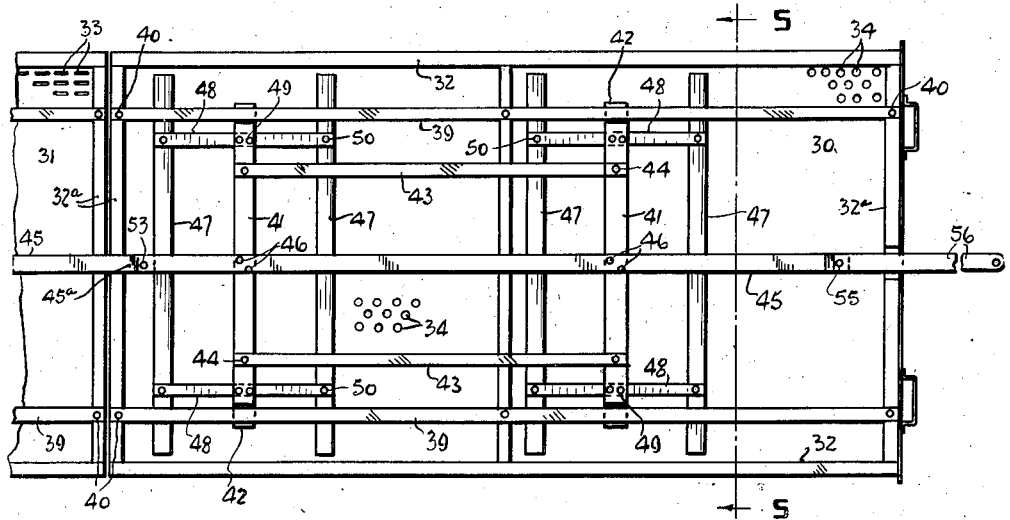
Fig. 4 is an inverted or bottom plan view of one screen, and a portion of another, showing my cleaning mechanism applied thereto.

This application is a division of my copending application for corn sizing apparatus, Serial No. 429,492, filed February 4, 1942. Attention is invited to this application for a complete disclosure of the apparatus, the present specification being restricted chiefly to the screen clearing or cleaning mechanism.

The apparatus in the form here shown is seen to comprise three screen shoes 10, 11 and 12 secured to and between upright side members 13 and 14 which at lower ends carry eccentric bearings 15 by which they are mounted and supported on shafts 16 and 17. These shafts are journaled crosswise between upright members 18 and 19 secured to a base frame 20 and one shaft 17 carries a pulley 21 connected by a belt 22 to a motor 23. Both shafts are connected at one side of the machine by a sprocket chain or belt 24 so that as the shaft 17 is rotated by the motor the shafts will both rotate in unison in the same direction.

Such rotation of the shafts, through action of eccentrics 25 carried thereon and received by the bearings 15, will cause the shoe assembly to be vibrated as a unit in a circular manner, having a vertical or up and down component of motion which is well calculated to cause the corn to feed along the screens in the shoes in the manner described in detail in my hereinbefore identified parent application. This movement further plays a cooperative and important part in the functioning of any screen clearing mechanism as will presently appear.

The base frame 20 also supports upright posts 26 which extend upwardly alongside one end of the shoes, this end of the assembly being hereinafter for convenience sake called the head or feed end, while the opposite end is called the tail or delivery end. At upper ends the posts 26 support a feed hopper 27 so that it will deliver the corn to be graded to the head end of the uppermost shoe 10.

Figure 5:
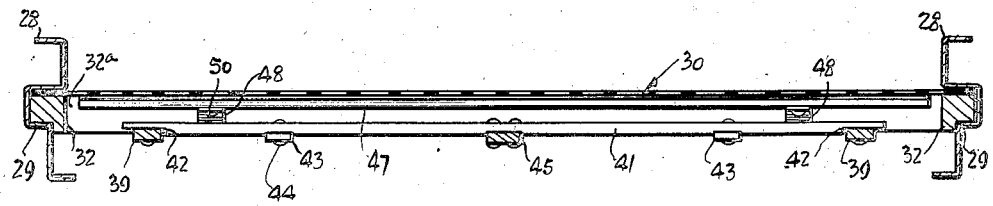
Fig. 5 is an enlarged cross section along the line 5—5 in Fig. 4, this view also showing the sides of the shoe in which the screen is fitted.

Each shoe comprises a frame made up of side members or channels 28 having longitudinal, inwardly opening grooves 29 (Fig. 5) adapted to slidably receive the margins of the screens themselves, there being two screens, designated generally at 30 and 31, for each shoe. The screens comprise rectangular frames, having sides 32 and ends 32ª, each substantially half the length of the shoe and covered with perforated screen material. One screen of each shoe has elongated slots or slotted openings 33 and the other has the round openings 34. The screen 31 having the slotted openings is inserted first endwise or drawer fashion through the head end of each shoe and is then followed by the screen 30 having the round openings, the two screens butting together at their meeting ends 35 as clearly shown.

The slotted screens deliver the graded or sized corn from the various spouts designated generally at 36, and the corn falling through the round holed screens is returned to the head of the shoe next below by return pans 37, except at the lower shoe where the "throughs" from the round holed screen are delivered at spout 38.

As stated, there is a pronounced tendency for the corn kernels to become lodged in both the slots and round openings of the screens and this results in a considerable loss in the screening capacity of the machine. To dislodge such kernels I provide the following mechanism.

Beneath each screen 30—31 there is extended a pair of longitudinal guide strips 39 parallel to and adjacent the frame sides 32, these strips being secured at their ends at 40 to the frame ends 32ª. Two carrier bars 41 are extended transversely between the guide strips 39 with their ends notched and slidably fitted over said strips as represented at 42, these carrier bars being connected and held in parallel relation by tie or brace strips 43 secured at their ends 44 to the bars. Flat operating bars 45 are slidably arranged lengthwise and centrally beneath each screen 30—31 and are secured at 46 to the carrier bars 41 so that by reciprocating the operating bars the carrier frame, constituted by the bars 41 and strips 43, will be moved back and forth lengthwise beneath the screens. For each carrier bar 41 two screen wiper bars or strips 47 are provided and disposed one to each side of the associated carrier bars. Leaf springs 48 are secured intermediate their ends at 49 crosswise near the ends of the carrier bars and at their ends are secured at 50 to the wipers 47 to yieldably support these members and normally urge them upward into frictional wiping contact with the undersides of the screens. The upper screen engaging sides of the wipers are longitudinally ribbed or serrated as shown at 51 to have a sort of angular camming action against any lodged kernels of corn which they may meet as the wipers are actuated.

Figure 6:
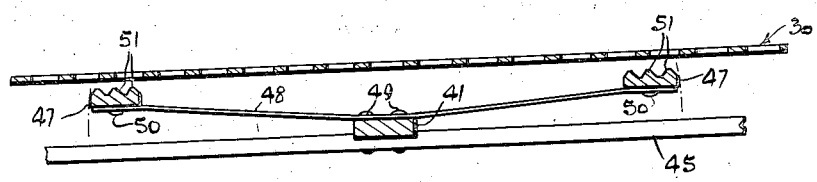
Fig. 6 is a further enlarged fragmentary sectional view of parts of the screen and cleaning mechanism, illustrating the hammering or tapping action.

The wipers or wiper strips 47 will be reciprocated or wiped along undersides of the screens by proper back and forth or endwise movements of the operating bars 45 and this action will to some extent serve to clear the screen openings of kernels lodged therein. However, in addition to this wiping action of the wiper strips, they further have a very important additional and cooperating action wherein they vibrate up and down beneath the screens and hammer or rapidly tap the undersides thereof. This action arises by virtue of the up and down component of the rotary eccentric shaking movements of the screens hereinbefore described, and by the spring mounting of the wipers. The leaf springs 48 are so mounted that the weight and inertia of the wipers will flex the springs (Fig. 6) as the entire screen assembly vibrates, causing the wipers to alternately spring downwardly away from the screens and spring back upwardly forcibly enough to hammer the screens. This movement of the wipers causes them to directly tap against any kernels which may be tightly lodged in the screen openings and the combination of the wiping, back and forth movements plus this hammering action is found in practice to very effectively and completely clear the screen of all lodged kernels. The action is further found to dislodge the kernels without chipping or damaging them in any way.

The operating bars 45 for the slotted screens 31, which are first inserted into the screen shoes as previously described, have their ends 45ª extended endwise from these screens to pass beneath the tail ends of the round holed screens 30 (Figs. 1–4), and these ends 45ª have apertures 52 adapted to releasably engage pins or studs 53 provided on the adjacent ends of the operating bars of said round holed screens. These ends 45ª are furthermore offset as at 54 (Fig. 2) to bring the bars of each pair of screens into alignment when they are thus connected. In inserting the screens, the tail or slotted screen 31 is connected by engaging the aperture 52 over the pin 53 whereupon not only will the wiping mechanisms of the respective screens operate as a unit but the screens may be withdrawn as a unit until the tail screen 31 may be reached to disconnect the operating bars. This is an advantage in replacing and changing the screens as will be evident.

The ends of the operating bars 45 nearest the head ends of the round holed screens 30 have attached thereto, by pivots 55, the links 56 which extend outwardly from beneath these ends of the screens. The head ends of the shoes include transverse angles 57 which upwardly support these links intermediate their ends. An upright rocker shaft 58 is journaled in bearing brackets 59 secured to one frame post 26 and at properly spaced points this shaft carries radially extending arms 60 which project at their free ends toward the outer ends of the links 56, the opposite ends of the arms being, of course, secured to the shaft to move therewith. These free ends of the arms 60 are pivotally connected at 61 to the links and, inasmuch as these connections must be disengaged to remove the screens, any suitable and known means may be provided for detaching the links from the arms. Indicated herein for the purpose are latches, one shown at 62 in Fig. 3, which when swung aside will permit the pins to be removed.

Adjacent its lower end the rocker shaft 58 carries a crank arm 63 to which is connected at 64 one end of a connecting rod or pitman 65, the other end of which is connected by a bearing 66 to a crank or eccentric 67 on a crankshaft 68. This crankshaft is journaled in bearing plates 69 secured to the base frame 20 and carries a pulley 70 connected by a belt 71 to a smaller pulley 72 secured on a short countershaft 73 journaled in bearings 74 affixed to the frame post 26. A large pulley 75 on the countershaft 73 is then connected by a belt 76 to a smaller pulley 77 in the shaft 17 and the arrangement is such that the motor 23 will rotate the crankshaft 68 at a comparatively slow speed. Obviously sprockets and chains might be used in lieu of the pulleys and belts herein shown.

This rotation of the crankshaft 68 will reciprocate the pitman 65 and oscillate the rocker shaft 58 about its vertical axis. Such movements will swing the arms 60 back and forth toward and away from the shoes and reciprocate the links 56 endwise to continuously wipe the wiper strips 47 along the undersides of the screens. The various leverages involved, and the spacing of the wiper strips 47, are calculated to cause the strips in their wiping motion to contact almost the entire area from end to end of the screens, the strips being shown as near the limit of their inward movement toward the tails of the screens.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination in a seed corn sizing apparatus having a screen and means for vibrating the same to cause up and down movements of the screen, of mechanism for clearing lodged corn kernels from the openings in the screen including at least one wiper member arranged beneath the screen, leaf spring means yieldably supporting the wiper member upwardly against the screen, the said spring means being of such nature that it will be vibrated by the said up and down movements of the screen to cause the wiper member to vibrate against the underside of the screen and means for moving the wiper member over the undersurface of the screen as it is being vibrated, the said wiper member having angular ribs on its upper side for angular camming engagement with lodged corn kernels in the screen.

2. In a corn grading apparatus, a shoe member, a pair of screens adapted for mounting endwise into the shoe member through one end thereof and to lie in end to end relation therein, wiping means for dislodging corn kernels from each screen, and said wiping means including operating members movably arranged on each screen and having releasable connections to actuate the wiping means of each screen in unison.

3. In a corn grading apparatus, a shoe member having an open end, a pair of screens adapted to be inserted one at a time drawer fashion through said open end and to lie in end to end relation in said shoe member, wiping means for clearing lodged corn kernels from the screens, and said wiping means including operating members extending in a generally lengthwise direction along each screen and having means for releasable connection adjacent the meeting ends of the screens whereby the wiping means for each screen may be operated in unison and whereby the first inserted screen may be pulled toward the open end of the shoe as the last inserted screen is removed therefrom.

4. In a corn sizing apparatus, a plurality of superimposed vibrating shoes having corn sizing screens, wiping means for each screen and including reciprocating operating members extended outward in one direction from the shoes, an upright rocker shaft at one end of the apparatus, power operated means for oscillating the shaft, and arms extending radially from the shaft and connected at their ends to said operating members for reciprocating the same in response to said oscillating movements of the rocker shaft.

HARRY L. JOHNSON.